United States Patent
Freeman

[19]

[11] Patent Number: 6,048,141

[45] Date of Patent: *Apr. 11, 2000

[54] TOOL FOR ENLARGING HOLE

[75] Inventor: Glenn D. Freeman, Chino, Calif.

[73] Assignee: Emhart Inc., Newark, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 09/003,476

[22] Filed: Jan. 6, 1998

[51] Int. Cl.[7] .................................................. B23B 51/00
[52] U.S. Cl. .......................... 408/201; 408/82; 408/214; 408/241 R
[58] Field of Search ............................... 408/214, 82, 81, 408/80, 201, 211, 225, 228

[56] References Cited

U.S. PATENT DOCUMENTS

| | | | |
|---|---|---|---|
| 1,004,902 | 10/1911 | Potter | 408/214 |
| 2,226,226 | 12/1940 | Hedin | 408/201 |
| 2,374,552 | 4/1945 | Marini | 408/201 |
| 4,289,432 | 9/1981 | Elkins et al. | 408/201 |
| 4,512,691 | 4/1985 | Dicke | 408/201 |
| 4,579,486 | 4/1986 | Damico | 408/204 |
| 4,749,315 | 6/1988 | Mills | 408/209 X |
| 4,968,189 | 11/1990 | Pidgeon | 408/80 |
| 5,366,326 | 11/1994 | Converse | 408/72 B |
| 5,413,437 | 5/1995 | Bristow | 408/80 |
| 5,695,304 | 12/1997 | Ebert | 408/227 |
| 5,743,682 | 4/1998 | Chaney, Sr. | 408/204 X |

FOREIGN PATENT DOCUMENTS

| | | |
|---|---|---|
| 704122 | 2/1954 | United Kingdom . |
| 1145305 | 3/1969 | United Kingdom . |
| 2257381 | 1/1993 | United Kingdom . |

*Primary Examiner*—William Briggs
*Attorney, Agent, or Firm*—Harness, Dickey & Pierce, P.L.C.

[57] ABSTRACT

A tool for enlarging the size of an existing bore to a selected enlarged size. The tool has a drill sized to define the enlarged bore, and a guide having a cylindrical body sized so that the guide can be rotated in the existing bore. The guide and drill including cooperating structures for releasably interconnecting the guide and the drill with the guide and drill coaxially aligned whereby, with the guide releasable secured to the drill, the guide can be located within the original hole to guide the cutting action of the drill as it enlarges the original hole.

18 Claims, 2 Drawing Sheets

TOOL FOR ENLARGING HOLE

The present invention relates to locksets which are to be mounted on a door and more particularly to replacement locksets.

BACKGROUND OF THE INVENTION

A lockset conventionally includes a latch assembly which has a cylindrical bolt supporting body insertable into a cylindrical bore drilled into the edge of the door. Replacement locksets may include a latch assembly which has a larger cylindrical bolt supporting body which is too big to be inserted into the original cylindrical hole. It may also be desirable to enlarge the strike hole in the door jamb. Enlarging a hole is a very difficult proposition.

It is known from U.S. Pat. No. 5,366,326, to snugly fit a hole saw guide into a through hole to be enlarged. This guide has a concentric hole which serves as a bearing surface for the pilot drill of a hole saw as the hole saw is brought into cooperation with the guide to enlarge the hole. The guide is tapered so that this snug fit can be achieved with small variations in hole size.

It is accordingly an object of the present invention to provide a tool for enlarging an existing hole which does not require the securement of a guide within the hole prior to the use of the drilling tool.

OBJECT OF THE INVENTION

Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE DRAWINGS

Referring to the drawings.

BRIEF DESCRIPTION OF THE PREFERRED EMBODIMENT

Figure 1:
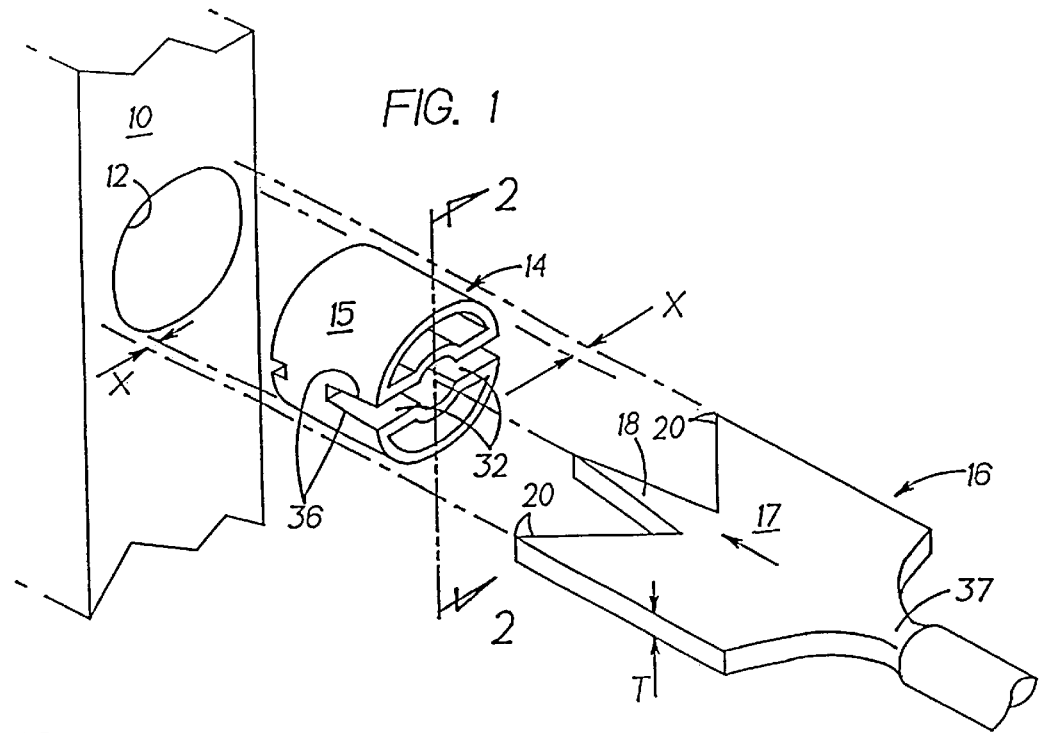
FIG. 1 is an oblique view of the drilling end of a spade bit being inserted into a plastic guide.
Figure 2:
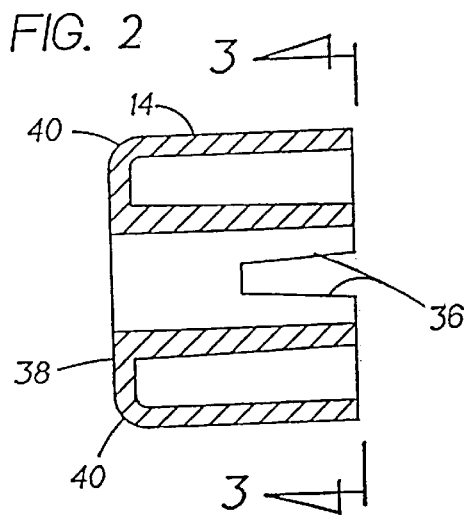
FIG. 2 is a view taken at 2—2 of FIG. 1.
Figure 3:
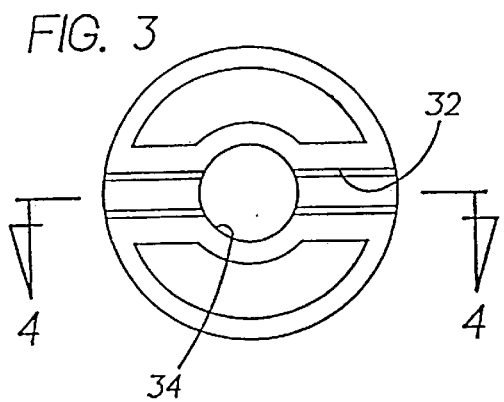
FIG. 3 is a view taken at 3—3 of FIG. 2.
Figure 4:
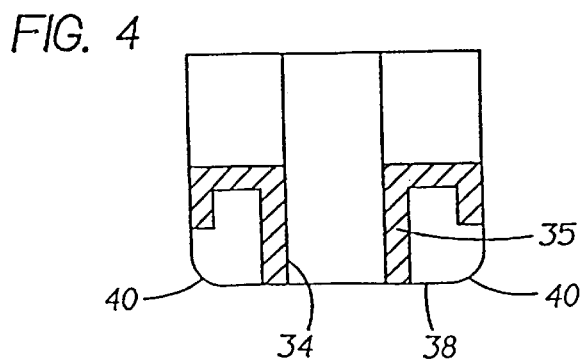
FIG. 4 is a cross sectional view of the plastic guide taken at FIG. 4—4 of FIG. 3.
Figure 5:
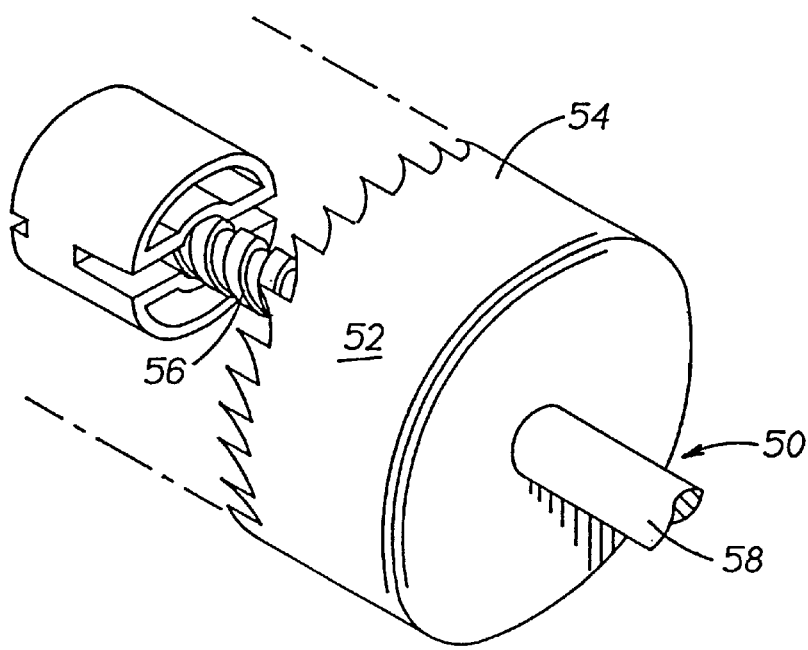
FIG. 5 is an oblique view of the drilling end of a Forsner bit partially screwed into the plastic guide shown in FIG. 1.
Figure 6:
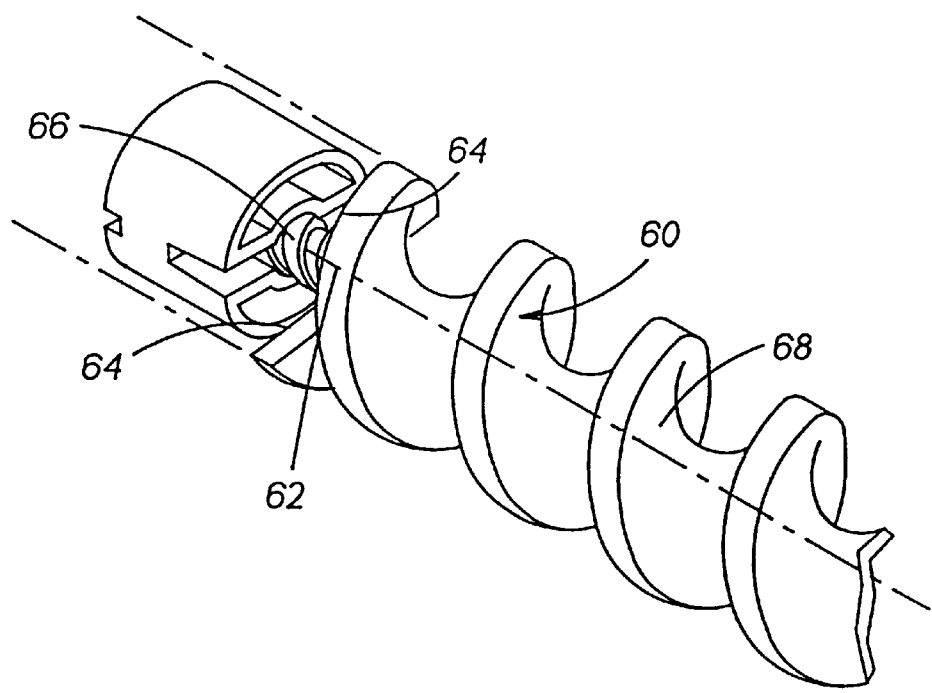
FIG. 6 is an oblique view of the drilling end of an Auger bit fully screwed into the plastic guide shown in FIG. 1.

FIG. 1 shows the edge of a door 10 having a bore 12 extending horizontally thereinto for receiving the cylindrical housing of a latch assembly of a conventional lockset (not shown). This bore has a selected diameter, 7/8", for example. It may become desirable to change locksets and to replace the existing lockset with another lockset which has a latch assembly that has a larger cylindrical body (1", for example). It then becomes necessary to enlarge this bore from 7/8" to 1", for example. Alternately, it may be desirable to enlarge the cylindrical bolt receiving hole in the strike and door jamb so that a strike plate having a bigger bolt receiving hole can be used. For example, it might be desirable to enlarge bolt receiving hole in the door jamb from 1" to 1 3/8", for example.

A cylindrical drilling guide 14, which may be made of plastic, has a cylindrical body 15 which has a diameter slightly smaller than the diameter of the existing bore (the guide can be slid easily into the hole and can be easily rotated within the bore). The guide can be releasably secured on the end of a conventional spade bit 16. The spade bit has a bit 17 which has a central tapered piercing spike 18 and a pair of opposed drilling blades 20. The bit has a thickness "T" and, as can be seen from FIG. 1, is "X" wider than the diameter of the guide corresponding in width to the diameter of the enlarged bore.

The drilling guide has an entrance slot 32 for receiving the front of the bit (a central hole 34 defined in a sleeve 35 which extends from the end of the slot to the end of the guide receives the piercing spike 18). The slot has walls 36 which are inwardly tapered so that the bit will be gripped by the guide (wedged into the slot) when the bit is pushed onto the drilling guide. The hole is dimensioned so that it will also grip the piercing spike when the bit is pushed onto the guide so that the guide will be coaxially aligned with the spade bit shaft 37. The front end 38 of the guide has a rounded annular edge 40 to facilitate insertion into the bore.

The guide can also be used with a Forsner bit 50 which has a cylindrical bit 52 carrying teeth 54 on its front edge. The Forsner bit also has a threaded screw 56 which projects axially past the teeth. The guide hole 34, which is continuous at the front end of the guide, is continued to the bit end by conforming the upper and lower slot defining surfaces 32 to the configuration of the hole. The hole is sized so that the threaded screw can be screwed into the hole until the guide, which is axially aligned with the shaft 58 of the bit, is firmly releasably secured to the bit.

The guide can also be used with an Auger bit 60 which has a cylindrical bit 62 carrying opposed blades 64 on its front edge. The Auger bit also has a threaded screw 66 which projects axially past the blades. The guide hole 34, is sized so that the threaded screw can be screwed into the hole until the guide, which is axially aligned with the axis 68 of the bit, is firmly releasably secured to the bit. When either of these tools is used, the guide can be used until the bit has defined the engaged hole sufficiently that it can function as the guide to complete the enlarged hole. At that time the tool can be withdrawn from the hole and the guide removed.

I claim:

1. A tool for enlarging the size of an existing bore to a selected enlarged size comprising:

a spade bit including a bit having, at the from thereof, a central tapered piercing spike and blades on either side of said spike sized to define the enlarged bore, a guide having a cylindrical body sized so that the guide can be rotated in the existing bore, said guide including a slot for receiving said piercing spike and a portion of the blades on either side of said piercing spike, said slot having inwardly converging walls so that said blade portions will become wedged within said slot when the bit is pushed into the slot, and said guide including a cylindrical central sleeve having an axially extending hole selectively sized for receiving and centering said piercing spike, whereby the tools can be secured to a power drill and the guide inserted into the original hole to guide the spade bit as it enlarges the hole.

2. A tool for enlarging the size of an existing bore to a selected enlarged size comprising:

a drill sized to define the enlarged bore, said drill including a bit and a central threaded screw projecting from said bit, a guide having a cylindrical body sized so that the guide can be rotated in the existing bore, said guide including a slot adapted to receive blade portions of a spade bit, said slot having inwardly converging walls so that the blade portions will become wedged within said slot when the bit is pushed into the slot, and said guide including a central hole for receiving said threaded screw, said central hole being configured so that said threaded screw will become wedged within said hole, when the screw is screwed into the hole, with said guide and said bit in coaxial alignment, and whereby the tool can be secured to a power drill and the guide inserted into the original hole to guide the spade bit as it enlarges the hole.

3. The tool of claim 2 wherein said bit is an Auger bit.

4. The tool of claim 2 wherein said bit is a Forsner bit.

5. A tool for enlarging the size of an existing bore to a selected enlarged size comprising:

a guide having a cylindrical body sized so that the guide can be slidingly inserted into the existing bore, a first end, a second end, an axis, a first passage extending axially from said first end toward said second end, and a second passage extending axially from said first end toward said second end; and a bit sized to define the enlarged bore and selectable from one of a spade bit or a cylindrical bit, said spade bit being disposable in said second passage to couple said guide to said spade bit with the guide and spade bit coaxially aligned, said cylindrical bit being disposable in said first passage to couple said guide to said cylindrical bit with the guide and cylindrical bit coaxially aligned.

6. A guide adapted for selective use with a first tool or a second tool for enlarging the size of an existing bore to a selected enlarged size, the first tool having a central tapered piercing spike and blades on either side of said spike sized to define the enlarged bore, the second tool having a cylindrical bit and a central threaded screw projecting beyond the bit, said guide comprising:

a cylindrical body sized so that the guide can be rotated in the existing bore, said body having a first end, a second end, an axis, a first passage extending axially from said first end toward said second end, and a second passage extending axially from said first end toward said second end, said first passage adapted to receive the first tool for coupling with the body, said second passage adapted to receive the second tool for coupling with the body.

7. The guide of claim 6 wherein said first passage includes a cylindrical passage extending from said first end through said second end of said body.

8. The guide of claim 7 wherein said second passage extends from said first end to a slot end face between said first and second ends.

9. The guide of claim 7 wherein said second passage includes a slot extending in opposed radial directions from said cylindrical passage.

10. The guide of claim 9 wherein the slot is adapted to receive the piercing spike and a portion of the blades on either side of the piercing spike, said slot being configured so that the blade portions will become wedged within said slot when the bit is pushed into the slot.

11. The guide of claim 10 wherein said guide body further includes a pair of opposed walls defining said slot, said walls including opposed arcuate segments centered about said axis, said arcuate segments cooperating to define said cylindrical passage.

12. The guide of claim 11 wherein said opposed walls converge toward one another as said walls extend from said first end toward said second end of said cylindrical body.

13. The tool of claim 5 wherein said cylindrical bit includes a bit and a central threaded screw projecting beyond said bit and wherein said first passage includes a central hole for receiving said threaded screw, said central hole being configured so that said threaded screw will become wedged within said hole, when the screw is screwed into the hole, with said guide and said cylindrical bit in coaxial alignment.

14. The tool of claim 5 wherein said spade bit includes a bit having, at the front thereof, a central tapered piercing spike and blades on either side of said spike sized to define the enlarged bore and wherein said second passage is configured so that said blade portions of said spade bit become wedged within said slot when the spade bit is pushed into the slot.

15. The tool of claim 14 wherein said second passage is inwardly tapered as said second passage extends from said first end toward said second end of said cylindrical body so that said blade portions of said spade bit become wedged within said slot when the spade bit is pushed into the slot.

16. The tool of claim 5 wherein said second passage includes a slot for receiving said piercing spike and a portion of the blades on either side of said piercing spike, said slot being configured so that said blade portions become wedged within said slot when the spade bit is pushed into the slot and wherein said first passage includes a cylindrical central sleeve having an axially extending hole selectively sized for receiving and centering said piercing spike.

17. The tool of claim 13 wherein said cylindrical bit is an Auger bit.

18. The tool of claim 13 wherein said cylindrical bit is a Forsner bit.

* * * * *